US006543939B1

(12) United States Patent
Parejko

(10) Patent No.: US 6,543,939 B1
(45) Date of Patent: Apr. 8, 2003

(54) FOOD GRADE CONCENTRIC BEARING LOCKING DEVICE

(75) Inventor: James A. Parejko, Plainfield, IL (US)

(73) Assignee: Emerson Power Transmission Manufacturing, L.P., Maysville, KY (US)

( * ) Notice: Subject to any disclaimer, the term of this patent is extended or adjusted under 35 U.S.C. 154(b) by 0 days.

(21) Appl. No.: 10/001,102

(22) Filed: Nov. 2, 2001

(51) Int. Cl.⁷ .............................................. F16C 33/76
(52) U.S. Cl. ...................................................... 384/477
(58) Field of Search ................................. 384/477, 537, 384/584, 585, 153

(56) References Cited

PUBLICATIONS

Brochure of Emerson Power Transmission CRES–02 Mounted Ball Bearings (No date).
Brochure of Emerson Power Transmission SLIC–00 Mounted Bearings (No date).
Brochure of Emerson Power Transmission TDC–00 Mounted Ball Bearings (No date).
Brochure of Emerson Power Transmission GOLD–00 Mounted Ball Bearings (No date).
Brochure of Emerson Power Transmission CRES–SS–01 Mounted Ball Bearings (No date).
Brochure of Emerson Power Transmission CRES–CV–00 Mounted Ball Bearings (No date).
Brochure of Emerson Power Transmission CRES–CS–00 Mounted Ball Bearings (No date).
Brochure of AMI Accu–Ioc Bearing Protection System (No date).
Brochure of AMI SHUR–SEAL Bearing Protection System (No date).
Brochure of Dodge DMR 1672–1 Bearings (No date).

*Primary Examiner*—Lenard A. Footland
(74) *Attorney, Agent, or Firm*—McDonnell Boehnen Hulbert & Berghoff

(57) ABSTRACT

An inner ring of a bearing for placement over a shaft having a first end with a series of finger extensions and a series of slots between the extensions, the inner ring further including finger extension slot seals positioned within the slots and a finger extension seal positioned on the outer diameter of the extensions.

12 Claims, 1 Drawing Sheet

FOOD GRADE CONCENTRIC BEARING LOCKING DEVICE

BACKGROUND OF INVENTION

1. Field of Invention

This invention is directed generally to bearing assemblies, and more particularly to an inner ring of a concentric bearing where the inner ring has compressible finger extensions for use with a shaft locking collar.

2. Background of the Invention

Bearing assemblies are installed in a broad variety of industrial applications and settings. It is known in the art to use a set screw, or series of set screws, to securely attach the inner ring of the bearing to a rotating shaft. One such bearing is the Goldline Set Screw bearing available from SealMaster®. In addition, it also known in the art to use a concentric inner ring having spaced, compressible finger extensions, such that a locking collar can be used to clamp the inner ring to the rotating shaft. One such bearing is the Goldline Skwezloc® bearing also available from SealMaster® that utilizes a locking collar. Various alternative locking collars are disclosed in U.S. Pat. No. 5,863,137.

Many bearing applications are required in corrosive environments or in harsh operating condition. For example, in food handling applications, stainless steel shafts are often used to protect against the corrosive, acidic effects of various food products, such meat, poultry, and beverage applications, where no rust and easy cleaning is desirable. Several undesirable effects may arise when using the above described set screw bearings. The set screws, when tightened against the relatively soft stainless steel shaft, can damage the shaft, requiring costly replacement and costly downtime. Normally, to alleviate the undesirable effects of using a set screw, a bearing having compressible finger extensions and a locking collar can be used to more evenly distribute the clamping force about the shaft. However, those in food handling applications are reluctant to use bearings with the compressible finger extensions, because the slots between the extensions provide a place for bacteria and other contaminants to reside. In food handling applications, the presence of any bacteria or contaminants is highly undesirable, as they could contaminant the food that is being processed.

Accordingly, there is a need to provide a bearing assembly suitable for use in food handling applications, and other applications where the presence of bacteria or contaminants is undesirable, that does not present the drawbacks associated with the use of a set screw and that also does not have the slots, or crevices associated with prior art bearings having compressible finger extensions where bacteria and other contaminants may reside.

SUMMARY OF THE INVENTION

The present invention is specifically directed to the inner ring of a concentric bearing locking device where the inner ring has compressible finger extensions such that the inner ring is suitable for attachment to a rotating shaft via a locking collar. The present invention is further provided with finger extension slot seals that fill the slots, or area between the finger extensions, to help eliminate the areas where bacteria and contaminants may congregate. A finger extension seal may further cover the outer circumference of the extensions to allow a further seal between the extensions and the locking collar. In a preferred embodiment, the finger extension seal is affixed to the finger extensions by using a low pressure overmolding operation which can be performed using a hand mold. Santoprene, or any other suitable elastomeric polymer, may be used as the seal material. Santoprene is desirable as it has previously received FDA approval for use in the food industry. Nonetheless, any number of types of seal material may be used. It is desirable that the seal material does not cover the inner diameter of the inner ring during the molding operation. To prevent the seal material from covering the inner diameter, a machined collar or expandable bladder may be used during the overmolding operation.

BRIEF DESCRIPTION OF THE DRAWINGS

Further advantages of the present invention will become apparent to those skilled in the art with the benefit of the following detailed description of the preferred embodiments and upon reference to the accompanying drawings in which.

Figure 1:
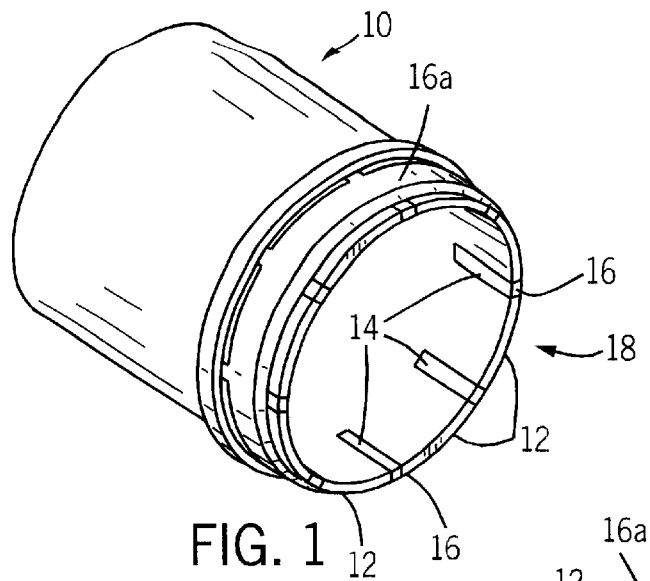
FIG. 1 is a perspective view of the inner ring of the bearing of the present invention.

While the invention is susceptible to various modifications and alternative forms, specific embodiments thereof are shown by way of example in the drawings and will herein be described in detail. It should be specifically understood with respect to the drawings, that the drawings are of the preferred embodiment, and there are many other embodiments and forms in which the present invention may appear. It should also be understood that the drawings and detailed description thereof are not intended to limit the invention to the particular form disclosed, but on the contrary, the invention is to cover all modifications, equivalents and alternatives falling within the spirit and scope of the present invention or within the scope of the appended claims.

In addition, while the present invention is particularly useful in food handling applications, it can be suitably used in any bearing assembly application.

DETAILED DESCRIPTION OF THE PREFERRED EMBODIMENT

Figure 2:
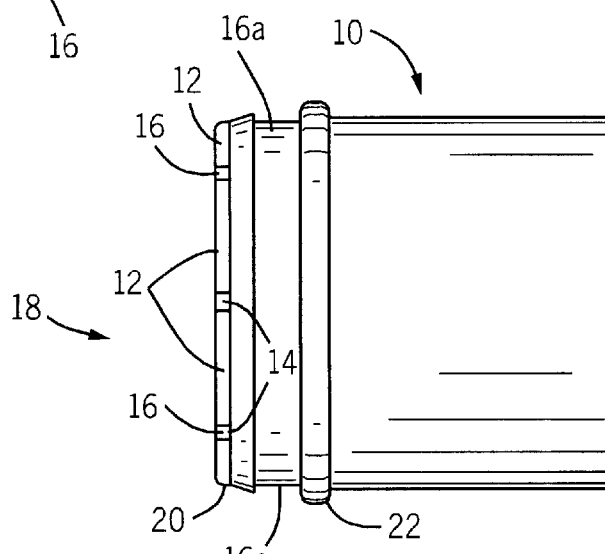
FIG. 2 is a side view of the inner ring shown in FIG. 1.
Figure 3:
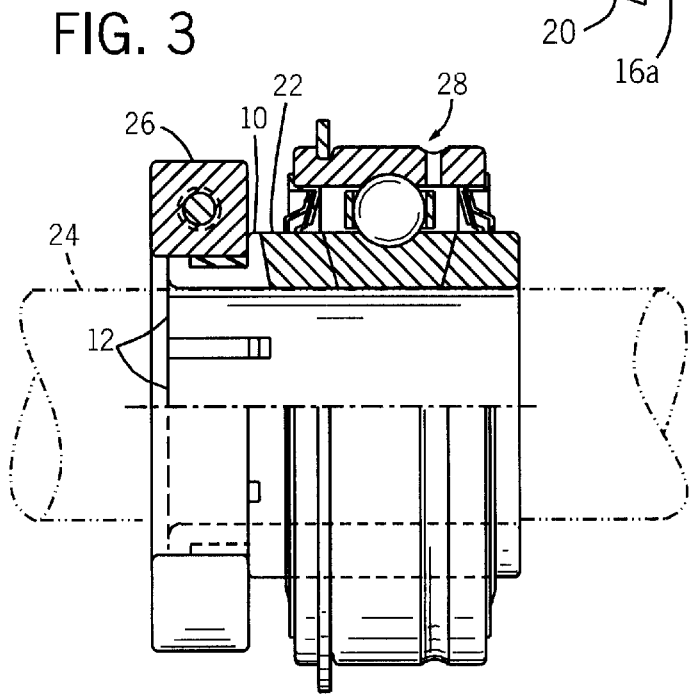
FIG. 3 is a cross-sectional view of a bearing assembly having the inner ring of the present invention secured to a shaft by a locking collar.

An inner ring 10 of a bearing made in accordance with the principles of the present invention is depicted in FIGS. 1–3. As shown in FIGS. 1 and 2, inner ring 10 includes a series of spaced apart finger extensions 12 situated about an outer end 18 of the inner ring 10. Slots 14 are positioned between each finger extension 12. In the embodiment shown, there are eight finger extensions 12 and eight corresponding slots 14 between each finger extension. The finger extensions allow a compressive force from a locking collar to clamp the inner ring to a rotating shaft. Preferably, the finger extensions are evenly spaced to help evenly distribute the clamping force of the locking collar (shown in FIG. 3). While eight finger extensions are shown, a greater or lesser number of extensions could be used, and the extensions need not be evenly spaced. The inner ring 10 is preferably made of stainless steel, or other material suitable for use in food handling applications, and may be made of a plastic composite or other corrosion resistant material.

As shown in FIG. 2, the outer end 18 of the inner ring 10 includes finger extension lips 20 and the inner ring also includes a collar rest 22. Finger extension slot seals 16 are positioned within slots 14, and a finger extension seal 16a may be positioned on the outer diameter of the finger extensions 12 and the outer end 18 of the inner ring 10 between finger extension lips 20 and collar rest 22. Finger extension slot seals 16 serve to prevent bacteria and contaminants from congregating within the slots 14, while finger extension seal 16a serves as an additional seal between the finger extensions and the locking collar (shown in FIG. 3) to further prevent bacteria and contaminants from entering the area of the finger extensions 12 and the slots 14. Finger extension slot seals 16 and finger extension seal 16a are preferably made of an elastomeric material, such as Santoprene, although any suitable seal material may be used. The finger extension slot seals 16 and finger extension seal 16 may be affixed to the outer end 18 of the inner ring using a low pressure overmolding process, which can be a hand molding process. To prevent seal material from extending into the inner diameter of the inner ring, a machined collar or inflatable bladder may be placed in the interior of the inner ring during the molding process.

FIG. 3 shows the inner ring 10 of the present invention attached to a rotating shaft 24. Locking collar 26 clamps the finger extensions 12 of the inner ring to the rotating shaft 24. A bearing assembly 28 is positioned about the exterior of inner ring 10 and abuts collar rest 22.

The present invention has been shown to be useful in food handling applications. However, it is contemplated that the present invention is not limited thereto and can be used in any application where it is desirable to prevent bacteria and contaminants from entering the area of the slots and finger extensions. The disclosed embodiment provides an advantage over prior art methods of affixing bearings to a rotating shaft. The present invention serves to reduce bacteria and contaminants from entering the area where the bearing is clamped to a rotating shaft.

Although the seals of the present invention are advantageously overmolded between the slots and onto the finger extensions of the inner ring, those skilled in the art will appreciate that any number of different ways of affixing the seals to the inner ring may be used without departing from the present invention.

While certain features and embodiments of the invention have been described herein, it will be readily understood that the invention encompasses all modifications and enhancements within the scope and spirit of the present invention.

What is claimed is:

1. An inner ring of a bearing assembly comprising:
   a first end and a second end and a passageway therethrough for placement over a shaft;
   said first end having a series of finger extensions and a series of slots between said extensions;
   said finger extensions being compressible to allow the inner ring to be clamped to the shaft by use of a locking collar;
   and finger extensions slot seals positioned within the slots.

2. The inner ring of claim 1, further including a finger extension seal positioned about the outer diameter of the finger extensions.

3. The inner ring of claim 2, wherein the finger extension seal is positioned between finger extension lips located on the outer diameter of the finger extensions and a collar rest positioned inwardly from the first end of the inner ring.

4. The inner ring of claim 1, wherein the finger extension slot seals are affixed within the slots by an overmolding process.

5. The inner ring of claim 4, wherein the overmolding process is a low pressure hand molding process.

6. The inner ring of claim 2, wherein the finger extension seal is adapted to form a seal between the finger extensions and a locking collar.

7. The inner ring of claim 2, wherein the finger extension seal is integral with said finger extension slot seals.

8. The inner ring of claim 7, wherein the finger extension slot seals and the finger extension seal are comprised of an elastomeric material.

9. The inner ring of claim 2, wherein the finger extension seal is affixed to the extensions by an overmolding process.

10. The inner ring of claim 9, wherein the overmolding process is a low pressure hand molding process.

11. The inner ring of claim 2, wherein the finger extension seal is comprised of an elastomeric material.

12. The inner ring of claim 1, wherein the finger extension slot seals are comprised of an elastomeric material.

\* \* \* \* \*